R. M. VARNER.
Seed Planter.
No. 25,690.
Patented Oct. 4, 1859.
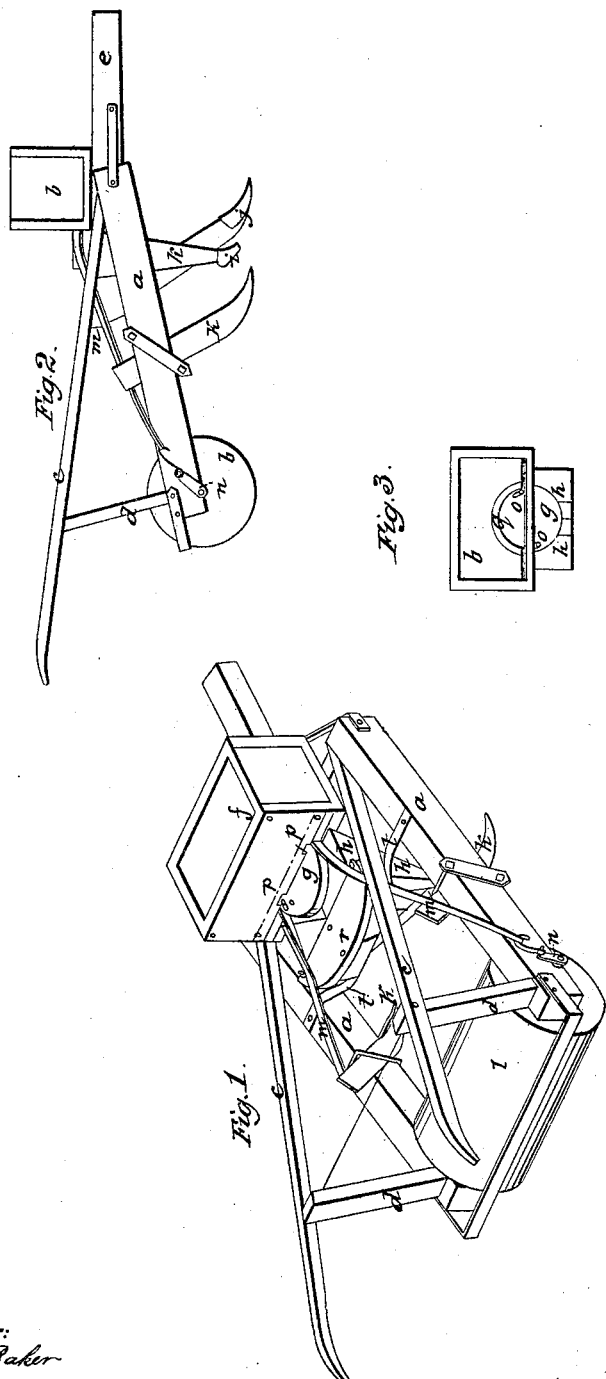

UNITED STATES PATENT OFFICE.

RUFUS M. VARNER, OF OXFORD, MISSISSIPPI.

IMPROVEMENT IN CORN-PLANTERS.

Specification forming part of Letters Patent No. 25,690, dated October 4, 1859.

*To all whom it may concern:*

Be it known that I, RUFUS M. VARNER, of Oxford, in the county of Lafayette and State of Mississippi, have invented certain new and useful Improvements on Corn-Planters; and I do hereby declare the following to be a full, clear, and exact description of the same, reference being had to the accompanying drawings, and to the letters and marks thereon.

The drawings forming part of this specification show a corn-planter with the improvements of my invention, Figure 1 being a perspective view, Fig. 2 a longitudinal sectional view, and Fig. 3 a top view, of the hopper and the feeding-disk.

In each of these figures where like parts are shown like letters and marks are used to indicate.

The frame-bars are marked $a$, the handles $c$, and their upright or supporting pieces $d$, the tongue $e$, the hopper $f$, the feeding-disk $g$, the feeding-tubes $h$, and outlet or mouth $i$, the furrow-plow $j$, the covering or spreading share $k$, the roller or pressing-cylinder $l$, the straps connecting the feeding-disk $m$, and the cranks upon the roller to which the straps are attached $n$.

In corn-planters generally considerable difficulty exists in passing the seed or grain regularly from the hopper to the distributing tube or tubes. Much of the difficulty arises from the want of suitable provisions for managing the larger or irregular shaped seeds or grains. Ordinarily such grains are jammed in between the surfaces of the feeding means, are broken or lost, and too frequently are thrown outside of the seeding-line of the soil, so that if they there germinate they are valueless, as the plowing and hoeing must destroy the growth from them.

One of the objects of my invention is to remedy the difficulty alluded to. Another object of my invention is to give to the feeding means a positive and regular motion, yet sufficiently elastic or yielding to meet the exigencies arising from the unevenness of the ground and the irregular movements of the planter from whatever cause, and to this end these means are so placed and arranged.

It will be noticed that the holes $o$ in the feeding-disk $g$, through which the grain passes from the hopper to the delivering-tube, are in the front portion of their edges gouged out, making thus an inclined track. It will also be noticed that in two places in the back side of the hopper the bottom edge is cut away, leaving spaces $p$ in line with the traverse of the holes of the disk; and it will be further noticed that on the inner surface of this part of the hopper there is a strip of india-rubber or other elastic material, indicated by red lines in the figures of the drawings. Now, it will readily be seen that if a large or irregular-shaped grain be in the hopper, the beveled edge $q$ of the hopper's bottom will facilitate such grains passing into the hole of the disk, and as the disk is vibrated the india-rubber strip will allow the grain to pass through the space $p$, and then on the return of the disk the grain will be turned out from the mouth of the hole off from the disk, and be dropped into the delivering-tube, so that none of the grains can be lost or reach that part of the soil or ground outside of the seeding-line, or any jamming or interruption to the regular working of the planter arise from the irregularities of the size or shape of the grains or seed. The disk $g$ derives its motions from the roller or cylinder $l$ through straps $m$, attached at one end to the disk and at the other end to the cranks $n$ at the ends of the roller. The cranks $n$ may be as shown by the drawings, or they may be adjustable, so that the throw of the straps and the vibrations of the disk may be increased or diminished, and a larger or smaller disk with holes of greater or less diameter or capacity may be substituted for that here shown, so as to adapt the planter to cotton or other seeds. The straps $m$ pass over a plate or table, $r$, and are prevented from slipping off by pins $s$. The table $r$ is attached to the back end of the tongue, the mouths of the distributing or delivering tube $h$ being between the table $r$ and the hopper. The rear end of the tongue rests upon springs $t$, and it will readily be seen that the table $r$ and the rear end of the tongue in the use of the planter will play between two elastic surfaces or sets of means, and thus the hopper, the feeding-disk, the table, the delivering-tube, and the furrow-plow will all derive a common advantage from the elastic bearings, the straps, and the springs.

Having thus set out the construction and operation of my improvements, what I claim as new, and desire to secure by Letters Patent, is—

1. The arrangement of the table $r$, delivering-tube $h$, furrow-plow $j$, feeding-disk $g$, hopper $f$, all attached to the rear end of the tongue, and placed between and subject to the action of the straps and the springs, as here described.

2. The combination of the spaces $p$ of the hopper's side with the india-rubber strip, the beveled edge of the hopper's bottom, and the gouged holes of the feeding-disk, as and for the purposes set forth.

This specification signed this 27th day of August, 1859.

RUFUS M. VARNER.

Witnesses:
 JOHN G. BAKER,
 T. T. EVERETT.